(12) United States Patent
Kuehnel et al.

(10) Patent No.: US 9,686,650 B2
(45) Date of Patent: *Jun. 20, 2017

(54) WIRELESS BEACON FILTERING AND UNTRUSTED DATA DETECTION

(71) Applicant: Microsoft Technology Licensing, LLC, Redmond, WA (US)

(72) Inventors: Thomas W. Kuehnel, Seattle, WA (US); Hiep V. Khuu, Bellevue, WA (US); Mark Lino Nielson, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,448

(22) Filed: Aug. 21, 2015

(65) Prior Publication Data
US 2016/0029171 A1    Jan. 28, 2016

Related U.S. Application Data

(63) Continuation of application No. 13/416,773, filed on Mar. 9, 2012, now Pat. No. 9,143,892.

(51) Int. Cl.
*H04W 24/00* (2009.01)
*H04W 4/02* (2009.01)
(Continued)

(52) U.S. Cl.
CPC .............. *H04W 4/023* (2013.01); *G01S 5/02* (2013.01); *H04W 4/02* (2013.01); *H04W 4/028* (2013.01);
(Continued)

(58) Field of Classification Search
CPC ..... H04W 64/00; H04W 4/028; H04W 84/18; H04W 4/027; H04W 4/023; H04W 52/0245
(Continued)

(56) References Cited

U.S. PATENT DOCUMENTS 8,045,482 B2 * 10/2011 Davis et al. .......... G01S 5/0009
370/254
8,320,939 B1    11/2012 Vincent
(Continued)

OTHER PUBLICATIONS

"Final Office Action", U.S. Appl. No. 13/416,773, Aug. 1, 2014, 25 pages.
(Continued)

*Primary Examiner* — Charles Appiah
*Assistant Examiner* — Jaime Holliday (57) ABSTRACT

A determination is made, at a device, as to whether data identifying signals detected at the device include data from a non-stationary wireless beacon. If the data includes data from a non-stationary wireless beacon then observation data including both the data and an associated trusted position of the device is maintained in an observation buffer; otherwise, the observation data is dropped by the device. The observation data from the observation buffer is provided to a service, which determines whether the observation data conforms to one or more patterns, the one or more patterns having been identified based on one or more criteria used by the device in providing the observation data to the service. If the observation data conforms to the one or more patterns then the observation data is maintained by the service; otherwise, the observation data is dropped by the service.

20 Claims, 7 Drawing Sheets

(51) Int. Cl.
  *H04W 64/00* (2009.01)
  *G01S 5/02* (2010.01)
  *H04W 52/02* (2009.01)
  *H04W 84/18* (2009.01)
  *H04W 4/00* (2009.01)
  *H04W 4/18* (2009.01)

(52) U.S. Cl.
  CPC ............ *H04W 64/00* (2013.01); *H04W 4/008* (2013.01); *H04W 4/027* (2013.01); *H04W 4/18* (2013.01); *H04W 52/0245* (2013.01); *H04W 84/18* (2013.01)

(58) Field of Classification Search
  USPC .......... 455/404.2, 414.1, 456.1–456.3, 456.6
  See application file for complete search history.

(56) References Cited

U.S. PATENT DOCUMENTS

| | | | | |
|---|---|---|---|---|
| 8,521,128 | B1* | 8/2013 | Welsh et al. | H04M 1/7253 455/404.2 |
| 9,143,892 | B2 | 9/2015 | Kuehnel et al. | |
| 2006/0046709 | A1 | 3/2006 | Krumm et al. | |
| 2011/0051665 | A1* | 3/2011 | Huang | G01S 5/0027 370/328 |
| 2011/0090123 | A1 | 4/2011 | Sridhara et al. | |
| 2011/0128183 | A1* | 6/2011 | Marshall | G01S 5/0252 342/357.29 |
| 2011/0143776 | A1 | 6/2011 | Shankaranarayanan et al. | |
| 2011/0191052 | A1 | 8/2011 | Lin et al. | |
| 2011/0205125 | A1 | 8/2011 | Lin et al. | |
| 2011/0227791 | A1 | 9/2011 | Lin et al. | |
| 2012/0021762 | A1* | 1/2012 | Garin et al. | G01C 21/206 455/456.1 |
| 2013/0046847 | A1* | 2/2013 | Zavesky et al. | G06Q 30/0261 709/217 |
| 2013/0237243 | A1 | 9/2013 | Kuehnel et al. | |

OTHER PUBLICATIONS

"Non-Final Office Action", U.S. Appl. No. 13/416,773, Jan. 8, 2014, 22 pages.

"Non-Final Office Action", U.S. Appl. No. 13/416,773, Nov. 21, 2014, 25 pages.

"Notice of Allowance", U.S. Appl. No. 13/416,773, May 22, 2015, 12 pages.

Barry,"Interactionless Calendar-Based Training for 802.11 Localization", Mobile Adhoc and Sensor Systems (MASS), 2010 IEEE 7th International Conference, Nov. 8-12, 2010, retrieved from <http://abarry.org/BarryTyeChangIEEEMass2010.pdf> on Dec. 15, 2011, Nov. 8, 2010, 9 pages.

Rogoleva,"Crowdsourcing Location Information to Improve Indoor Localization", Master Thesis, available at <http://e-collection.ethbib.ethz.ch/eserv/eth:1224/eth-1224-01.pdf>, Apr. 30, 2010, 91 pages.

* cited by examiner

WIRELESS BEACON FILTERING AND UNTRUSTED DATA DETECTION

RELATED APPLICATIONS

This application is a continuation of and claims priority to U.S. patent application Ser. No. 13/416,773 filed Mar. 9, 2012 entitled "Wireless Beacon Filtering and Untrusted Data Detection", the entire disclosure of which is hereby incorporated by reference herein in its entirety.

BACKGROUND

As cellular phones have become more commonplace and powerful, the desire for certain applications to provide location-based functionality on these phones has increased. In order to provide such location-based functionality, the position of the phone needs to be known at any time in any environment. The position of a phone can sometimes be determined based on coordinates received from a global positioning system (GPS) of the phone. However, it remains difficult to determine the position of a phone under certain circumstances, such as when the GPS of the phone is not able to determine an accurate position of the phone, or when the phone does not include GPS functionality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a service receives from a device observation data identifying signals detected by the device at a particular position. A determination is made as to whether the observation data conforms to one or more patterns, the one or more patterns having been identified based on one or more criteria used by the device in providing the observation data to the service. In response to determining that the observation data conforms to the one or more patterns, the observation data is maintained. In response to determining that the observation data does not conform to the one or more patterns, the observation data is dropped.

In accordance with one or more aspects, in a device data identifying signals detected by a module of the device at a particular time is received. A trusted position of the device at that particular time is also received. A determination is made as to whether the received data includes data identifying signals detected from a non-stationary wireless beacon. In response to determining that the received data does not include data identifying signals detected from a non-stationary wireless beacon, a record of observation data is maintained in an observation buffer. The record of observation data includes the received data and associates the received data with the received trusted position. In response to determining that the received data does include data from a non-stationary wireless beacon, the received data is dropped.

BRIEF DESCRIPTION OF THE DRAWINGS

The same numbers are used throughout the drawings to reference like features.

DETAILED DESCRIPTION

Wireless beacon filtering and untrusted data detection is discussed herein. At a device, observation data including data identifying the signals detected by the device and an associated trusted position is collected and stored in a buffer of the device. The device provides the observation data to a crowd sourcing data service in response to various criteria being satisfied. The crowd sourcing data service uses one or more identified patterns, based on the criteria used by the device in providing the observation data to the crowd sourcing data service, to determine whether to maintain or drop the observation data. The crowd sourcing data service also identifies over time non-stationary wireless beacons, provides indications of the non-stationary wireless beacons to the device, and also drops (e.g., deletes) any observation data including data identifying signals received from a non-stationary wireless beacon. Once an indication of a non-stationary wireless beacon is received, the device also drops (e.g., deletes) observation data including data identifying signals received from the non-stationary wireless beacon, preventing such observation data from being subsequently provided to the crowd sourcing data service or otherwise used by the device. The buffer of the device can also be used as a local cache, providing a position of the device in some situations and providing an approximate position of the device in other situations to reduce an amount of time taken by a Global Navigation Satellite System (GNSS) module to obtain a position of the device.

Figure 1:
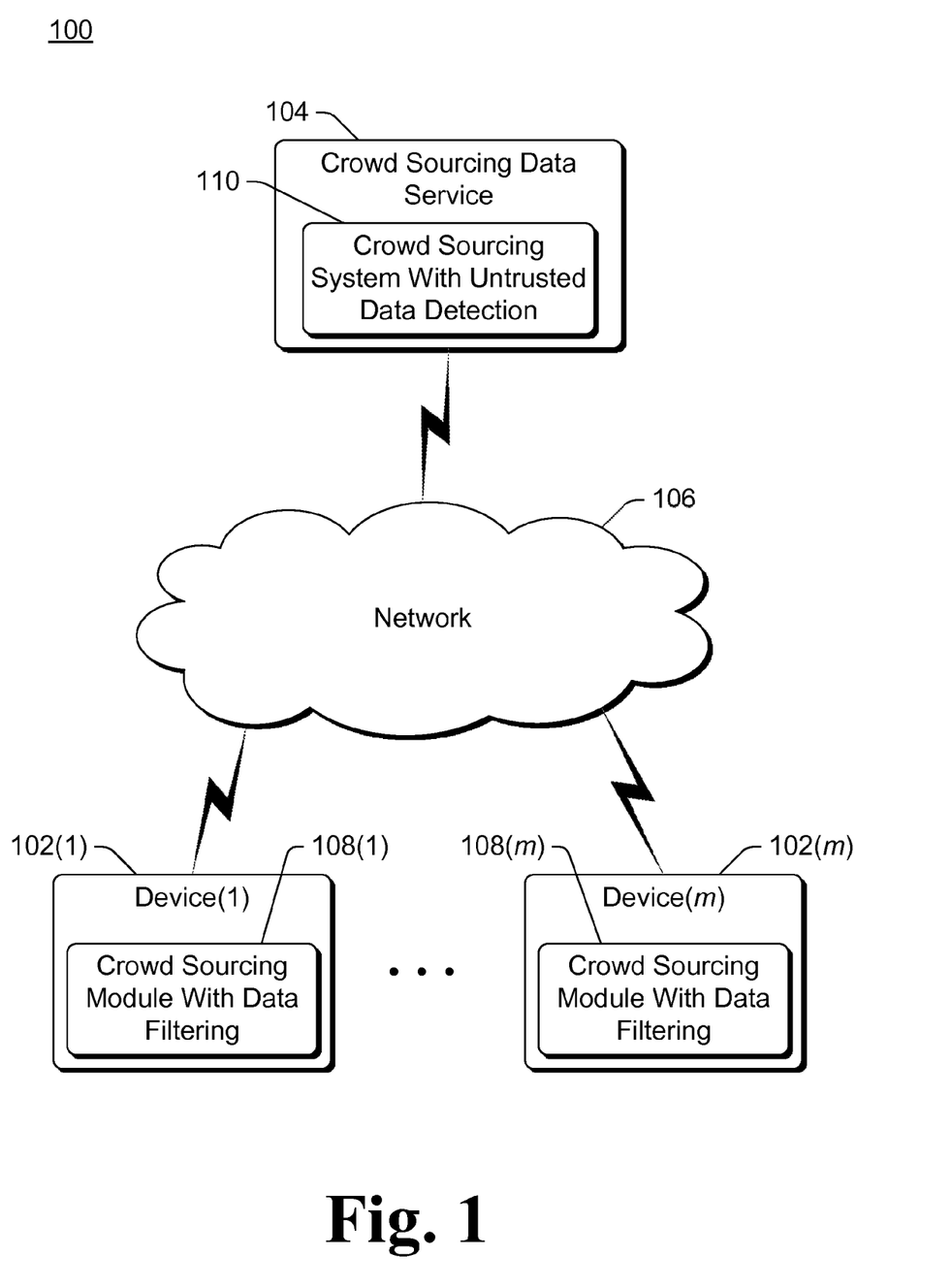
FIG. 1 illustrates an example system implementing the wireless beacon filtering and untrusted data detection in accordance with one or more embodiments.

FIG. 1 illustrates an example system 100 implementing the wireless beacon filtering and untrusted data detection in accordance with one or more embodiments. System 100 includes one or more (m) devices 102 that can communicate with a crowd sourcing data service 104 via a network 106. Network 106 can be a variety of different networks, including the Internet, a local area network (LAN), a wide area network (WAN), a telephone network, an intranet, other public and/or proprietary networks, combinations thereof, and so forth.

Each device 102 can be a variety of different types of devices, with different devices 102 being the same and/or different types of devices. A device 102 is typically a mobile device, the position of which is expected to change frequently over time. For example, a device 102 can be a cellular or other wireless phone, a laptop or netbook computer, a tablet or notepad computer, a mobile station, an entertainment appliance, a game console, an automotive computer, and so forth. Thus, devices 102 may range from full resource devices with substantial memory and processor resources (e.g., laptop computers, tablet computers) to low-resource devices with limited memory and/or processing resources (e.g., entertainment appliances, hand-held game consoles).

A device 102 records data identifying signals that the device 102 receives and a corresponding position of the device 102 at various points in time, as discussed in more detail below. A device 102 can also optionally provide various other functionality in addition to recording the data identifying received signals and corresponding device position at various points in time, such as phone or other communication functionality, automotive computer functionality, gaming functionality, and so forth. Alternatively, a device 102 can be a dedicated position sensing device that supports little, if any, functionality other than recording the data identifying received signals and corresponding device position at various points in time.

Each device 102 includes a crowd sourcing module 108 that supports data filtering. Each crowd sourcing module 108 can filter the data identifying signals that device 102 receives at various points in time, as discussed in more detail below. Although illustrated as a single module, it should be noted that the functionality of module 108 can alternatively be separated into multiple modules. Data indicating the position of the device 102, as well as data identifying signals received by the device 102 (and optionally strengths and/or timings of those signals) at that indicated position, at various times is recorded by device 102. This recorded data is also referred to as crowd sourcing data, and is provided to crowd sourcing data service 104. Crowd sourcing as used herein refers to each of multiple (typically a large number, such as many thousands of or more) devices providing data to a service, so the service obtains data from a crowd of devices rather than relying on data from a single device. Both the individual devices and the service play a part in the crowd sourcing.

Crowd sourcing data service 104 receives recorded data from multiple devices 102, collecting the data for subsequent use. The data collected by crowd sourcing data service 104 can be used to provide various location-based or position-based functionalities. As used herein, a location refers to a general or larger geographic area rather than a precise coordinate, such as one or more buildings (e.g., home or work), a business or store, and so forth. A position, however, refers to a geographic area that is more precise than a location, such as a coordinate in some coordinate system (e.g., a particular latitude and/or longitude), a particular elevation (e.g., altitude), and so forth. Thus, each location can include multiple positions. Crowd sourcing data service 104 is implemented using one or more devices. The one or more devices used to implement crowd sourcing data service 104 can be a variety of different types of devices, such as server computers, desktop computers, any of the various types of devices discussed above with reference to devices 102, and so forth. Service 104 can be implemented using multiple ones of the same and/or different types of devices.

Crowd sourcing data service 104 includes a crowd sourcing system 110 with untrusted data detection. Crowd sourcing system 110 identifies data received from devices 102 that are deemed to be untrusted, and drops (e.g., deletes or otherwise does not rely on) the data received from such untrusted devices as discussed in more detail below.

In one or more embodiments, the recording of data indicating the position of a device and/or the providing of the recorded data to crowd sourcing data service 104 is performed only after receiving user consent to do so. This user consent can be an opt-in consent, where the user takes an affirmative action to request that the position data be recorded and/or provided before crowd sourcing module 108 performs any recording of data for the device and/or providing of data to crowd sourcing data service 104. Alternatively, this user consent can be an opt-out consent, where the user takes an affirmative action to request that the position data not be recorded and/or provided; if the user does not choose to opt out of this recording and/or providing of the position data, then it is an implied consent by the user to record the position data and provide the data to crowd sourcing data service 104.

Furthermore, it should be noted that the techniques discussed herein can allow devices 102 to provide position data to crowd sourcing data service 104, but need not include any personal information identifying particular users of devices 102 and/or particular devices 102. For example, a device 102 can record position data and provide the position data to service 104, but no association between the device 102 and the position data need be provided to and/or maintained by service 104. Similarly, no association between the user of the device 102 and the position data need be provided to and/or maintained by service 104.

Figure 2:
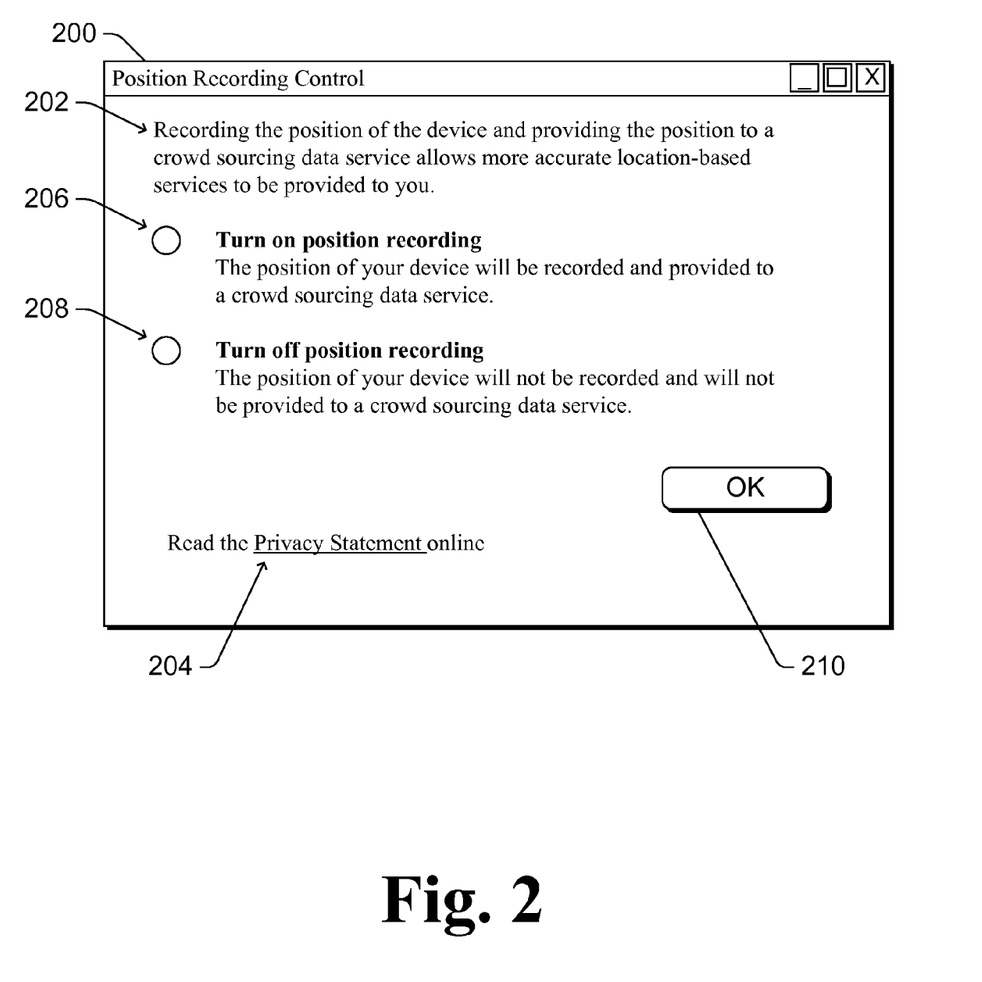
FIG. 2 illustrates an example user interface that can be displayed to a user of a device to allow the user to select whether position data for that device will be recorded and provided to a crowd sourcing data service in accordance with one or more embodiments.

FIG. 2 illustrates an example user interface that can be displayed to a user of a device to allow the user to select whether position data for that device will be recorded and provided to a crowd sourcing data service in accordance with one or more embodiments. A position recording control window 200 is displayed including a description 202 explaining to the user why the position of the device is being recorded. A link 204 to a privacy statement is also displayed. If the user selects link 204, a privacy statement is displayed, explaining to the user how the recorded position data is kept confidential and/or how no association between the position and the device (as well as the user of the device) is maintained.

Additionally, the user is able to select a radio button 206 to opt-in to the position recording, or a radio button 208 to opt-out of the position recording. Once a radio button 206 or 208 is selected, the user can select an "OK" button 210 to have the selection saved. It is to be appreciated that radio buttons and an "OK" button are only examples of user interfaces that can be presented to a user to opt-in or opt-out of the position recording, and that a variety of other conventional user interface techniques can alternatively be used. The device then proceeds to record the device position and provide the device position to a crowd sourcing data service, or neither record the device position nor provide the device position to a crowd sourcing data service, in accordance with the user's selection.

Figure 3:
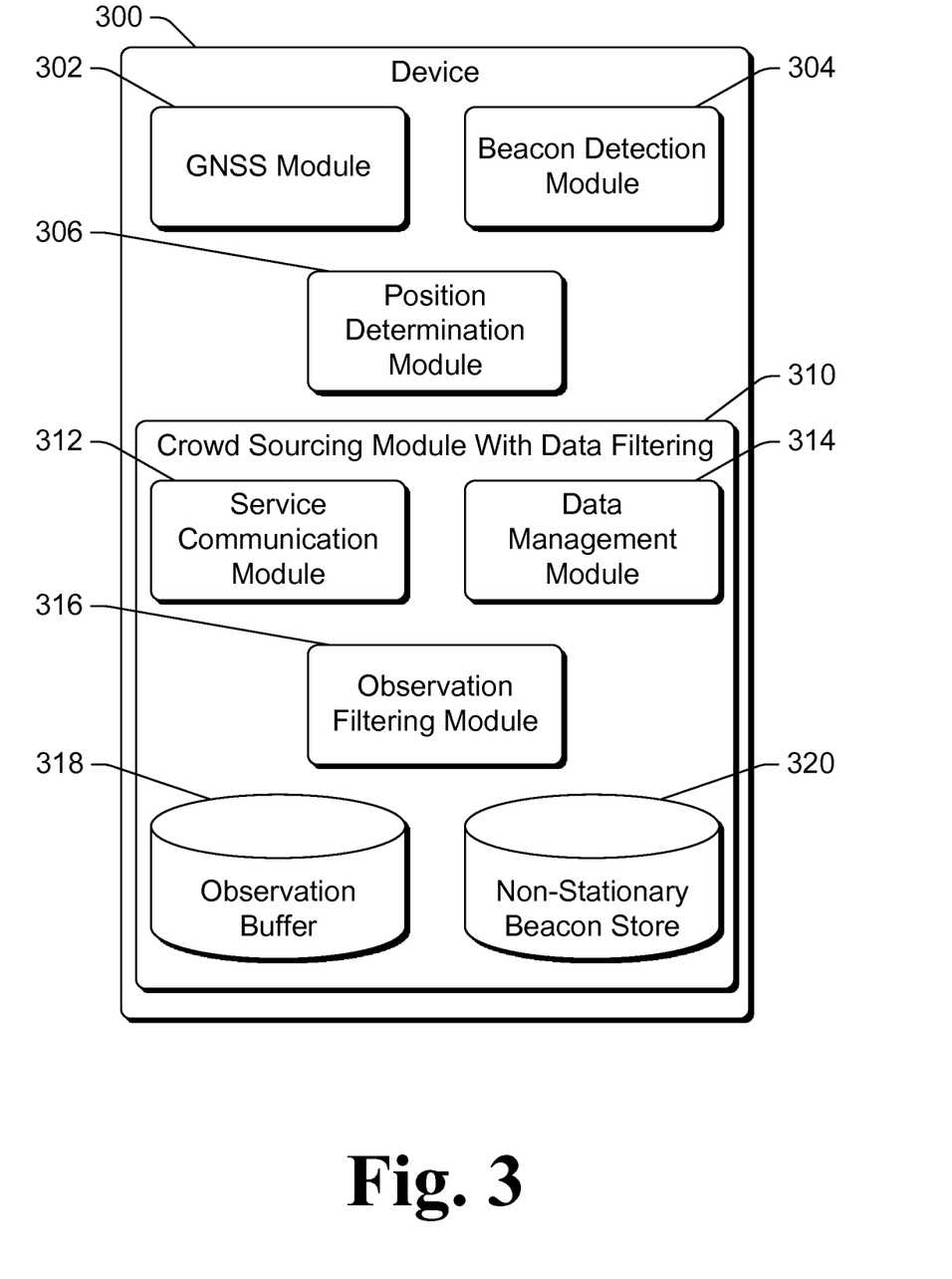
FIG. 3 illustrates an example device implementing the wireless beacon filtering and untrusted data detection in accordance with one or more embodiments.

FIG. 3 illustrates an example device 300 implementing the wireless beacon filtering and untrusted data detection in accordance with one or more embodiments. Device 300 can be, for example, a device 102 of FIG. 1. Device 300 includes a Global Navigation Satellite System (GNSS) module 302, a beacon detection module 304, a position determination module 306, and a crowd sourcing module 310 with data filtering. Crowd sourcing module 310 can be, for example, a crowd sourcing module 108 of FIG. 1. Crowd sourcing module 310 includes a service communication module 312, a data management module 314, an observation filtering module 316, an observation buffer 318, and a non-stationary beacon store 320. Although modules 302, 304, and 306 are illustrated as separate from crowd sourcing module 310, at least part of module 302, 304, and/or 306 can be included as part of crowd sourcing module 310. Each module 302-316 can be implemented in software, firmware, hardware, or combinations thereof. Although specific modules are illustrated in FIG. 3, it should be noted that additional modules can be included in device 300. Additionally, it should be noted that the functionality of multiple modules illustrated in FIG. 3 can be combined into a single module, and/or the functionality of one or more modules illustrated in FIG. 3 can be separated into multiple modules.

GNSS module 302 implements GNSS functionality for device 300, determining a position of device 300 based on one or more satellites from which GNSS module 302 can receive signals or otherwise communicate. This determined position is typically latitude and longitude coordinates (and optionally altitude), although the position can alternatively be specified in other manners. GNSS module 302 can implement the GNSS functionality using a variety of different technologies, such as the Global Positioning System (GPS), the Global Navigation Satellite System (GLONASS), the BeiDou (or Compass) navigation system, the Galileo positioning system, combinations thereof, and so forth.

GNSS module 302 provides or otherwise makes available the determined position of device 300 to various other modules of device 300. GNSS module 302 can also provide or otherwise make available an indication of the strength of signals received by module 302 from satellites.

GNSS module 302 can determine the position of device 300 at regular or irregular intervals. GNSS module 302 can also determine the position of device 300 in response to various events, such as a request from another module of device 300.

Beacon detection module 304 detects wireless signals, and optionally various characteristics of those wireless signals received at device 300. Various characteristics of the wireless signals can be detected, such as the strength, timing, and/or correlation of the wireless signals received at device 300. The source of (e.g., transmitter of) the wireless signals is also referred to herein as a wireless beacon (or simply a beacon). Beacon detection module 304 can detect wireless signals, and optionally the various characteristics of the wireless signals at regular or irregular intervals. Beacon detection module 304 can also detect wireless signals, and optionally the various characteristics of the wireless signals, in response to various events, such as a request from another module of device 300.

One or more of various different types of wireless signals can be detected by beacon detection module 304. In one or more embodiments, the type of wireless signals detected by beacon detection module 304 are Wi-Fi signals. Beacon detection module 304 can receive signals from various wireless access points, including an identifier of a particular wireless access point and/or a particular wireless network from which a signal is received. For example, a wireless access point sends a unique media access control (MAC) address of the wireless access point, which is also called a basic service set identifier (BSSID) of a wireless network supported by the wireless access point, at regular intervals. Beacon detection module 304 can also measure the strength (e.g., received signal strength indicator (RSSI) values) of these received radio signals, the timing of the signals with respect to a reference time and frequency, and/or the relationship to other signals received from other sources such as other Wi-Fi access points. It should be noted that module 304 can, at any given time for any given position of device 300, receive signals from multiple wireless access points. Beacon detection module 304 provides or otherwise makes available an indication of the identifiers of the detected signals (the particular wireless access points and/or wireless networks from which signals are received), as well as the various characteristics of those signals, to various other modules of device 300.

Another type of wireless signals that can be detected by beacon detection module 304 are cellular signals. Beacon detection module 304 can receive signals from various cell transceivers (e.g., cell towers), including an identifier of a particular cell transceiver (e.g., a cell tower or transceiver identifier) from which a signal is received. Beacon detection module 304 can also measure various characteristics of these received signals, such as strength (e.g., RSSI values), timing, frequency, and/or correlation of these received signals. It should be noted that module 304 can, at any given time for any given position of device 300, receive signals from multiple cell transceivers. Beacon detection module 304 provides or otherwise makes available an indication of the identifiers of the detected signals (the particular cell transceivers from which signals are received), as well as the various characteristics of those signals, to various other modules of device 300

Beacon detection module 304 can also detect various other types of wireless signals, and can also measure various characteristics of these various other types of wireless signals, such as strength (e.g., RSSI values), timing, frequency, and/or correlation of these various other types of wireless signals. For example, beacon detection module 304 can detect television signals from various television transmitters at various frequencies, including an identifier (e.g., call sign or call letters) of a station or other entity transmitting on each of various frequencies. By way of another example, beacon detection module 304 can detect AM radio signals from various radio transmitters at various frequencies, including an identifier (e.g., call sign or call letters) of a station or other entity transmitting on each of various frequencies. By way of yet another example, beacon detection module 304 can detect FM radio signals from various radio transmitters at various frequencies, including an identifier (e.g., call sign or call letters) of a station or other entity transmitting on each of various frequencies. By way of yet another example, beacon detection module 304 can detect wireless signals from Bluetooth transmitters, Bluetooth Low Energy (BLE) transmitters, Near Field Communication (NFC) transmitters, and so forth. Beacon detection module 304 can also detect signals other than electromagnetic radio signals, including signals at the other end of the spectrum such as light. For example, an ambient sensor can be used to capture the characteristics of those signals which may be in itself modulated. Beacon detection module 304 can also detect acoustic signals such as audio waves or ultrasound.

Beacon detection module 304 provides data identifying the signals detected by module 304 to crowd sourcing module 310. Crowd sourcing module 310 filters the data received from module 304 and provides the filtered data to a crowd sourcing data service (such as service 104 of FIG. 1) as discussed in more detail below. The data identifying the signals detected by module 304 include an identification of the detected signals (e.g., an identifier of a wireless access point, an identifier of a wireless network, an identifier of a cell transceiver, an identifier of a station other entity transmitting on a particular frequency, etc.) and optionally various characteristics of the detected signals. The identification of the detected signals (and optionally also one or more characteristics of the detected signals) is also referred to as a fingerprint of the detected signals.

In one or more embodiments, identifying of a trusted position by device 300 is an event in response to which beacon detection module 304 detects one or more signals. Thus, each time a trusted position is identified by device 300, beacon detection module 304 also detects one or more wireless signals. A trusted position refers to a position that is deemed by device 300 to be a reliable identification of the position of device 300, and can be determined in different manners. In one or more embodiments, the trusted position is a position identified by GNSS module 302. In other embodiments, the trusted position is a position identified by a wireless signal received from a wireless transmitter, such as from a Bluetooth transmitter, a BLE transmitter, a radio frequency transmitter, an NFC transmitter, and so forth. Each such transmitter can transmit a signal that is detected by device 300 (e.g., beacon detection module 304) and can include an indication of the position of the wireless beacon. The position of the wireless beacon can be transmitted in different manners, such as being transmitted as latitude and longitude coordinates, being transmitted as an identifier that can be looked up in a table included as part of or otherwise accessible to device 300 to determine a corresponding position of the wireless beacon, and so forth.

Crowd sourcing module 310 associates the trusted position with the data identifying the signals detected by module 304, and provides the trusted position and data identifying the signals detected by module 304 to a crowd sourcing data service (such as service 104 of FIG. 1) as discussed in more detail below. The signals detected by module 304 (and optionally various characteristics of the signals) and the associated trusted position at a particular time are also referred to as an observation. The data identifying the signals detected by module 304 (and optionally various characteristics of the signals) and the data identifying the associated trusted position at a particular time are also referred to as the observation data at that particular time. The crowd sourcing data service can use the observation data in various manners, such as to subsequently identify positions of a device (device 300 or other devices) in response to a request from the device. For example, a device can provide to the crowd sourcing data service data identifying signals detected by the device at a particular time, and the crowd sourcing data service can readily identify a trusted position of the device based on both the signals detected by the device and the observation data received from multiple devices.

In addition to, or alternatively in place of, beacon detection module 304 detecting one or more wireless signals each time a trusted position is identified by device 300, one or more wireless signals can be detected and/or a trusted position determined at other times. For example, one or more wireless signals can be detected and a trusted position determined in response to a change in one or more wireless signals detected by module 304 (e.g., a change in the sources of the wireless signals, a change in one or more characteristics of the wireless signals, etc.). By way of another example, one or more wireless signals can be detected and a trusted position determined in response to a particular amount of time elapsing since one or more wireless signals were last detected and/or a trusted position last determined. The one or more wireless signals can alternatively be detected and/or a trusted position alternatively determined in response to various other events (e.g., a sensor detecting that device 300 has moved at least a threshold distance, a change in power state of device 300, and so forth).

Data management module 314 receives the data identifying the signals detected by module 304 at a particular time as well as an identification of a trusted position (e.g., from GNSS module 302 or beacon detection module 304) at that particular time. Data detected and a trusted position determined are treated as being at the same particular time if they are detected/determined at identical times or within a threshold amount of time of one another (e.g., within 3 seconds). Data management module 314 stores a record of observation data at a particular time in observation buffer 318, the observation data at that particular time including both the data identifying the signals detected by module 304 (and optionally various characteristics of the signals) at that particular time and data identifying the determined trusted position at that particular time. The data identifying the signals detected by module 304 at that particular time and the determined trusted position at that particular time are thus associated with one another. In one or more embodiments, data management module 314 also stores as part of the observation data a timestamp of the particular time. The timestamp can be different times, such as the date and time the data identifying the signals was detected by beacon detection module 304 or the time the trusted position was determined, the date and time the data identifying the signals detected by module 304 or the data identifying the trusted position is received or obtained by data management module 314, and so forth.

Observation filtering module 316 filters the observation data stored in observation buffer 318 to prevent duplicate observation data from being provided to the crowd sourcing data service by service communication module 312. In one or more embodiments, observation filtering module 316 operates in conjunction with data management module 314 to prevent module 314 from storing duplicate records of observation data in observation buffer 318. Alternatively, observation filtering module 316 can analyze observation buffer 318 to identify duplicate records of observation data stored by module 314 in buffer 318, and remove duplicate records of observation data after the records are stored in buffer 318 by module 314.

Observation data is referred to as a duplicate of other observation data if the trusted positions identified in the two observation data are within a threshold distance of one another. It should be noted that this distance can be two-dimensional (e.g., based on latitude and longitude) or three-dimensional (e.g., based on latitude, longitude, and altitude). Observation filtering module 316 can be configured with or otherwise obtain the threshold distance. The threshold distance can be a fixed distance (e.g., 100 meters), or alternatively can vary based on the type of detected signals identified in the observation data. Generally, a larger threshold distance is used for wireless signals having a greater range than wireless signals having a smaller range. For example, one threshold distance (e.g., 5 kilometers) can be used for cellular signals (e.g., which may have a range of up to 35 kilometers), and another threshold distance (e.g., 20 meters) can be used for Wi-Fi signals (e.g., which may have a range of 100 meters).

In some situations, observation data can include data identifying multiple types of wireless signals. In such situations, observation data can be referred to as a duplicate of other observation data only if the trusted positions identified in the two observation data for all of the types of wireless signals identified in the two observation data are within a threshold distance of one another. For example, if the two observation data include data identifying detected cellular signals as well as data identifying detected Wi-Fi signals, then one observation data is a duplicate of the other observation data if the positions in the two observation data are within the threshold distance for both cellular signals (e.g., 5 kilometers) and Wi-Fi signals (e.g., 20 meters). Alternatively, observation data can be referred to as a duplicate of other observation data only if the positions identified in the observation data for one or more (but fewer than all) of the types of wireless signals identified in the two observation data are within a threshold distance of one another.

In one or more embodiments, a record of observation data is dropped from observation buffer 318 if the observation data is a duplicate of other observation data already stored in observation buffer 318. Crowd sourcing module 310 dropping observation data refers to not storing the observation data in observation buffer 318 (or deleting the observation data from observation buffer 318 if already stored in buffer 318). Thus, in such embodiments duplicate records of observation data are not maintained in observation buffer 318 (although duplicate records of observation data may be included in buffer 318 for short amounts of time, such as the time between data management module 314 storing a record of observation data and observation filtering module 316 identifying the record as a duplicate of observation data). Observation filtering module 316 and/or data management module 314 can optionally include as part of the observation data an indication of how many duplicates of observation data were detected. For example, each time observation data that is a duplicate of other observation data already stored in observation buffer 318 is received, a counter included in the observation data already stored in observation buffer 318 can be incremented.

Service communication module 312 manages communication with and data transfer between device 300 and a crowd sourcing data service (e.g., service 104 of FIG. 1). Service communication module 312 provides observation data from observation buffer 318 to the crowd sourcing data service. In one or more embodiments, module 312 provides observation data to the crowd sourcing data service in a secure manner so that other devices or other entities cannot view the observation data. Service communication module 312 can provide the observation data in a secure manner using any of a variety of techniques, such as establishing a secure communication channel between device 300 and the crowd sourcing data service (e.g., using a Transport Layer Security (TLS) or Secure Sockets Layer (SSL) channel) via which the observation data is communicated, by encrypting the observation data with a public key of a public/private key pair of the crowd sourcing data service, and so forth.

Service communication module 312 applies one or more of various criteria in determining when the observation data is to be provided to the crowd sourcing data service. In response to one or more of the criteria being satisfied, which is also referred to herein as a particular event occurring, service communication module 312 transmits the observation data in observation buffer 318 to the crowd sourcing data service. Module 312 typically transmits all of the observation data in buffer 318 to the crowd sourcing data service, although alternatively module 312 can transmit less than all of the observation data in buffer 318. The amount of data transmitted can be dependent on various criteria, such as the current cost of the transmission, the battery state, etc. For example, when a free Wi-Fi connection is present all data is uploaded at once. By way of another example, when the device is roaming (and no free Wi-Fi connection is present) only the data sufficient to allow subsequent processing of location requests to the crowd sourcing data service is transmitted.

In one or more embodiments, the criteria applied by service communication module 312 includes device 300 otherwise accessing the crowd sourcing data service. Device 300 otherwise accessing the crowd sourcing data service refers to device 300 accessing the crowd sourcing data service for some purpose other than to transmit observation data to the crowd sourcing data service. Device 300 can access the crowd sourcing data service for various purposes, such as to obtain an indication of a position of device 300 (e.g., based on detected wireless signals), to obtain or provide status or control information for use in accessing the crowd sourcing data service, and so forth.

In one or more embodiments, the criteria applied by service communication module 312 includes device 300 being connected to a particular type of network (e.g., a Wi-Fi network). Service communication module 312 can determine the type of network in various manners, such as by receiving an indication from a module or component of device 300 in response to device 300 being connected to a network, accessing a registry or other data storage location indicating a type of network that device 300 is connected to, monitoring events or messages in a notification system of device 300, and so forth.

In one or more embodiments, the criteria applied by service communication module 312 includes a threshold amount of observation data being stored in observation buffer 318. This threshold amount can be based on a number of observation data records (e.g., a threshold number of records of observation data) and/or an amount of storage space available in buffer 318 (e.g., a threshold percentage of the available storage space in buffer 318).

In one or more embodiments, the criteria applied by service communication module 312 includes a type of power being used to power device 300. For example, device 300 may be powered by battery or by AC power (e.g., when device 300 is plugged into or otherwise connected to a charging source).

In one or more embodiments, service communication module 312 determines that observation data is to be provided to the crowd sourcing service in response to device 300 otherwise accessing the crowd sourcing service, in response to device 300 being connected to a particular type of network (e.g., a Wi-Fi network), in response to a threshold amount of observation data being stored in observation buffer 318, and/or in response to device 300 being powered by a particular type of power (e.g. AC power). Alternatively, other criteria and/or combinations of criteria can be used by service communication module 312 in determining when observation data is to be provided to the crowd sourcing service.

Thus, observation buffer 318 is a temporary store of observation data. Data management module 314 stores observation data in buffer 318, and service communication module 312 retrieves observation data from buffer 318 for transmission to a crowd sourcing data service. Observation data may not be deleted from observation buffer 318 after being transmitted to the crowd sourcing data service to allow for duplicate detection of already transmitted data. For example, observation data may not be deleted from observation buffer 318 until buffer 318 is filled with data, at which point observation data is deleted from buffer 318 in a first in, first out manner.

Figure 4:
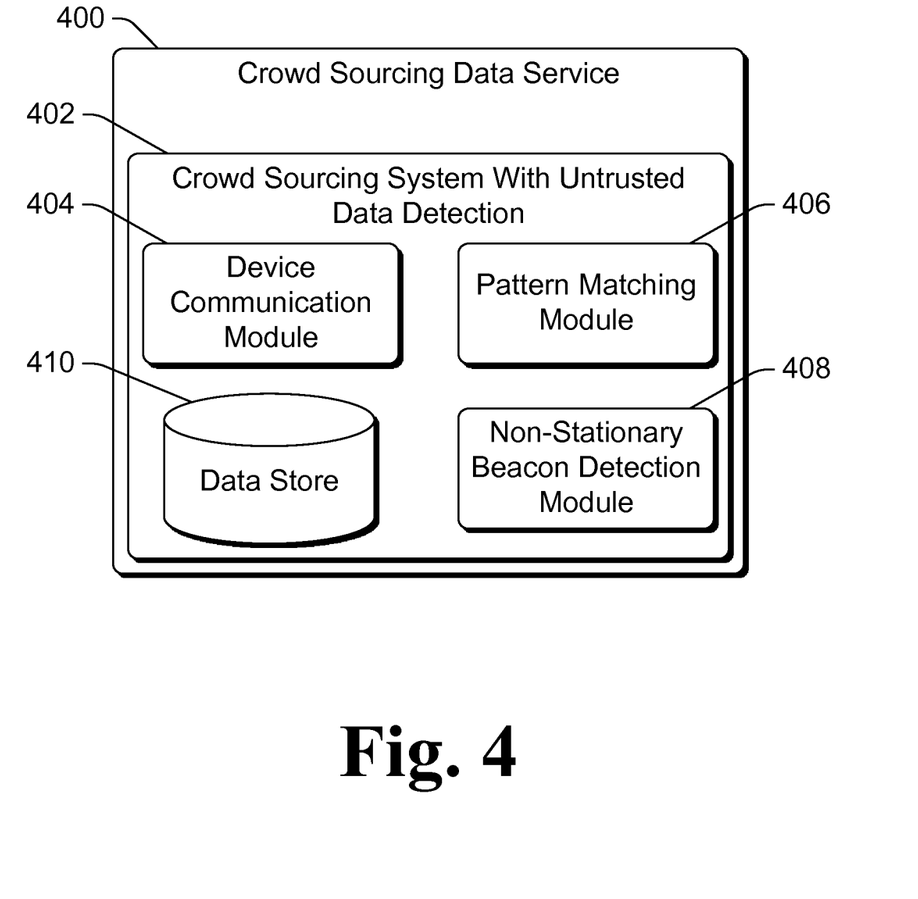
FIG. 4 illustrates an example crowd sourcing data service in accordance with one or more embodiments.

FIG. 4 illustrates an example crowd sourcing data service 400 in accordance with one or more embodiments. Crowd sourcing data service 400 can be, for example, a crowd sourcing data service 104 of FIG. 1. Crowd sourcing data service includes a crowd sourcing system 402 with untrusted data detection, which can be, for example, a crowd sourcing system 110 of FIG. 1. Crowd sourcing system 402 includes a device communication module 404, a pattern matching module 406, a non-stationary beacon detection module 408, and a data store 410. Each module 404-408 can be implemented in software, firmware, hardware, or combinations thereof. Although specific modules are illustrated in FIG. 4, it should be noted that additional modules can be included in service 400. Additionally, it should be noted that the functionality of multiple modules illustrated in FIG. 4 can be combined into a single module, and/or the functionality of one or more modules illustrated in FIG. 4 can be separated into multiple modules.

Device communication module 404 manages communication with and data transfer between crowd sourcing data service 400 and various devices (e.g., device 300 of FIG. 3 or devices 102 of FIG. 1). Device communication module 404 receives observation data from various devices (e.g., device 300 of FIG. 3 or devices 102 of FIG. 1) and maintains the received observation data in data store 410. Device communication module 404 receives observation data from multiple different devices, and crowd sourcing data service 400 can use the observation data in various manners. For example, crowd sourcing data service 400 can return to the device, in response to a location request and data identifying signals detected by the device, a location of the device based on the observation data in data store 410. Sensitive data, such as observation data received from various devices (e.g., device 300 of FIG. 3 or devices 102 of FIG. 1) is separated from the identifier of the device from which the observation data is received, so that no device identifier is stored in data store 410.

As discussed above, devices apply one or more of various criteria in determining when to provide observation data to crowd sourcing data service 400. This criteria can be leveraged by crowd sourcing system 402 to identify patterns in observation data received from devices. The filtering performed by the devices (e.g., to avoid recording duplicate observation data) can also be leveraged by crowd sourcing system 402 to identify one or more patterns in observation data received from devices. The one or more patterns can be determined by pattern matching module 406, or alternatively provided to or otherwise made available to pattern matching module 406. For example, the one or more patterns can be provided to module 406 as a configuration setting (e.g., by an administrator of crowd sourcing data service 400), can be provided to or otherwise made available by another module or system, and so forth. The particular one or more patterns identified are based on the criteria used by the devices.

For example, given the filtering performed by devices to avoid recording duplicate observation data as discussed above, a pattern can be readily identified that two observation data identifying trusted positions within a threshold distance of one another are not provided by a device at greater than a particular rate (e.g., a rate at which the observation buffer is emptied so that a duplicate would not be detected, such as one hour). By way of another example, given the filtering performed by and criteria used in determining when to provide observation data to crowd sourcing data service 400, a pattern can be readily identified that a device records no more than a threshold number of observations over a threshold amount of time (e.g., no more than twenty observations over ten minutes).

If a device provides observation data to crowd sourcing data service 400 that does not conform to the one or more identified patterns, then pattern matching module 406 determines that the observation data provided by that device is not to be trusted (is untrusted data), and thus that the device providing that observation data is an untrusted device. An untrusted device could be a faulty or malfunctioning device, a malicious device (e.g., controlled by a user or program desiring to provide incorrect observation data to crowd sourcing data service 400), and so forth.

Pattern matching module 406 monitors observation data received from devices and determines whether the observation data received from a device conforms to the identified one or more identified patterns. If the observation data from a device does conform to the one or more identified patterns, then the observation data is stored in data store 410 (or allowed to remain in data store 410 if already stored in data store 410). However, if the observation data from a device does not conform to the one or more identified patterns, then the observation data is dropped. Crowd sourcing system 402 dropping observation data refers to not storing the observation data in data store 410 (or deleting the observation data from data store 410 if already stored in data store 410). Dropped observation data is thus deleted or otherwise ignored by crowd sourcing data service 400. Crowd sourcing data service 400 thus does not rely on (e.g., to subsequently identify positions of a device) observation data that does not conform to the one or more identified patterns.

In one or more embodiments, pattern matching module 406 maintains a record (e.g., in data store 410 or alternatively elsewhere) of untrusted devices. Untrusted devices can be identified in different manners, such as a hardware identifier assigned to the device, an identifier (e.g., Media Access Control (MAC) address) of a network adapter used by the device to communicate with crowd sourcing data service 400, the IP addresses and TCP port used by the device to communicate with the service, and so forth. Once a device is identified as an untrusted device, crowd sourcing system 402 can drop observation data received from the untrusted device without again determining if the observation data received from the device conforms to the one or more identified patterns. Alternatively, pattern matching module 406 can continue to determine whether observation data received from the untrusted device conforms to the one or more identified patterns. If observation data received from the untrusted device conforms to the one or more identified patterns (optionally after a threshold amount of time, or after a threshold amount of observation data has been received), then the device can be determined to no longer be an untrusted device, and can be removed from the record of untrusted devices. In one or more other embodiments, no such record of untrusted devices is maintained by crowd sourcing data service 400.

It should be noted that if a record of untrusted devices is maintained, no record of the user or owner of such untrusted devices need be maintained. It should also be noted that if a record of untrusted devices is maintained, the record can be encrypted by crowd sourcing system 402 so that a user or administrator of crowd sourcing data service 400 cannot view the record of untrusted devices.

It should be noted that data identifying a device from which observation data is obtained can be maintained temporarily by crowd sourcing data service 400. Such data is maintained for a short amount of time (e.g., less than ten minutes, less than one hour) to allow pattern matching module 406 to determine whether the observation data conforms to the one or more identified patterns. After such determination is made by module 406, the data identifying the device from which the observation data is maintained can be deleted. The device can be identified in different manners, such as a hardware identifier assigned to the device, an identifier (e.g., MAC address) of a network adapter used by the device to communicate with service 400, an identifier of a secure communication channel established between the device and service 400, and so forth. Although an identifier of the device may be maintained temporarily, no record of the user or owner of the device need be maintained. It should also be noted that the identifier of the device can be encrypted by crowd sourcing system 402 so that a user or administrator of crowd sourcing data service 400 cannot view the identifier of the device. Furthermore, sensitive data, such as observation data received from various devices (e.g., device 300 of FIG. 3 or devices 102 of FIG. 1) can be separated from the identifier of the device from which the observation data is received. For example, an indication of the device from which observation data is received that allows the device to be distinguished from other devices but does not identify the particular device (e.g., an indicator that the device identifier is mapped to) rather than the device identifier itself can be maintained temporarily as associated with the observation data.

Non-stationary beacon detection module 408 detects non-stationary wireless beacons. A non-stationary wireless beacon refers to a wireless beacon that moves to different positions at greater than a particular frequency, as opposed to a wireless beacon that generally remains in the same position (is stationary). In one or more embodiments, non-stationary wireless beacon detection module 408 identifies non-stationary wireless beacons as wireless beacons that move at greater than a threshold frequency (e.g., move to different positions (as identified by the trusted positions associated with the data identifying the signals in the observation data) more than a threshold number of times over a threshold amount of time). This frequency can be, for example, monthly or weekly. Thus, a wireless beacon (such as a wireless beacon in a place of business or a home) that is moved occasionally (e.g., once every few weeks) would not be considered non-stationary, whereas a wireless beacon (such as a wireless beacon in a vehicle) that moves frequently (e.g., hourly) would be a non-stationary wireless beacon.

Non-stationary beacon detection module 408 detects and maintains a record of (e.g., identifiers of) non-stationary wireless beacons (e.g., in data store 410 or alternatively elsewhere). If the observation data from a device includes data identifying signals detected from a non-stationary wireless beacon, then the observation data is dropped. Observation data that is dropped is not stored in data store 410 (or is deleted from data store 410 if already stored in data store 410), and can be deleted or otherwise ignored by crowd sourcing data service 400. Crowd sourcing data service 400 thus does not rely on (e.g., to subsequently identify positions of a device) observation data that includes data from a non-stationary wireless beacon.

In one or more embodiments, non-stationary wireless beacon detection module 408 operates in conjunction with pattern matching module 406 and/or device communication module 404 to prevent observation data including data identifying signals detected from a non-stationary wireless beacon from being recorded in data store 410. Alternatively, non-stationary wireless beacon detection module 408 can analyze data store 410 to identify observation data including data identifying signals detected from a non-stationary wireless beacon, and remove observation data including data identifying signals detected from a non-stationary wireless beacon from data store 410 after the observation data is stored in data store 410.

Device communication module 404 also provides indications of (e.g., identifiers of) non-stationary wireless beacons, as detected by non-stationary beacon detection module 408, to the various devices from which observation data is received. These indications can be provided at various times, such as in response to a communication from a device (e.g., a request for a location, a request for status or control information, providing of observation data, and so forth), at regular or irregular intervals as determined by crowd sourcing system 402, and so forth.

Returning to FIG. 3, service communication module 312 receives indications of (e.g., identifiers of) non-stationary wireless beacons from a crowd sourcing data service (e.g., crowd sourcing data service 400 of FIG. 4), and maintains a record of non-stationary wireless beacons in non-stationary beacon store 320. Crowd sourcing module 310 uses the record of non-stationary wireless beacons to drop observation data that includes data from a wireless beacon that is non-stationary. In one or more embodiments, observation filtering module 316 operates in conjunction with data management module 314 to prevent observation data including data identifying signals detected from a non-stationary wireless beacon from being recorded in observation buffer 318. Alternatively, observation filtering module 316 can analyze observation buffer 318 to identify observation data including data identifying signals detected from a non-stationary wireless beacon, and remove observation data including data identifying signals detected from a non-stationary wireless beacon from observation buffer 318 after the observation data is stored in observation buffer 318.

Position determination module 306 obtains a current position of device 300 in response to a request (e.g., from another module of device 300, from an application or program running on device 300, and so forth). Position determination module 306 can obtain the current position of device 300 in various manners. In one or more embodiments, position determination module 306 requests a current position of device 300 from crowd sourcing module 310. Data management module 314 checks observation buffer 318 to determine whether buffer 318 includes a record of an observation having a timestamp within a threshold amount of time (e.g., five seconds) of the current time (e.g., the time the request is received). If such a record is present in observation buffer 318, then the trusted position included in the observation data of that record is returned to position determination module 306 and used as the position of device 300. Observation buffer 318 can thus operate as a local cache, allowing the position of device 300 to be provided in certain situations without accessing GNSS module 302 and/or beacon detection module 304.

If the current position of device 300 is not available from observation buffer 318, then position determination module 306 can invoke beacon detection module 304 to detect one or more wireless signals. Position determination module 306 communicates the detected one or more wireless signals to a crowd sourcing data service (e.g., crowd sourcing data service 400 of FIG. 4), and receives a position of device 300 based on the detected one or more wireless signals. This received position is used as the position of device 300.

Alternatively, if the current position of device 300 is not available from observation buffer 318, then position determination module 306 can invoke GNSS module 302 to obtain a position of device 300. In response, GNSS module 302 determines a position of device 300 based on one or more satellites from which GNSS module 302 can receive signals or otherwise communicate, and this position is used as the position of device 300. In determining a position of device 300, GNSS module 302 can leverage crowd sourcing module 310. GNSS module 302 can obtain an indication of the most recent position of device 300 as identified in observation buffer 318 (e.g., the trusted position included in the record of observation data having the most recent timestamp). GNSS module 302 can request the indication of the most recent position of device 300 (e.g., from data management module 314) or be provided the indication by position determination module 306 (e.g., which obtained the indication from data management module 314).

The manner in which GNSS module 302 uses the indication of the most recent position of device 300 can vary based on the manner in which GNSS module 302 is implemented. Generally, the indication of the most recent position of device 300 provides GNSS module 302 with an indication of an approximate or general position of device 300 (e.g., typically within a couple hundred kilometers). GNSS module 302 can proceed with attempting to identify one or more satellites from which a signal can be received based on the approximate or general position of device 300. For example, GNSS module 302 can begin with attempting to identify one or more satellites from which a signal can be received based on satellites from which module 302 is expected (e.g., based on a table or mapping included in or accessible to module 302) to be able to receive a signal in light of the approximate position of device 300. This can reduce the amount of time taken by GNSS module 302 to identify the position of device 300 because module 302 is beginning with attempting to identify one or more satellites from which a signal can be received with satellites from which module 302 is likely to receive a signal. Thus, even if observation buffer 318 does not include observation data with a trusted position that can itself be used as the position of device 300, the trusted position from observation buffer 318 can be used by GNSS module 302 to reduce the amount of time taken to identify the position of device 300.

Figure 5:
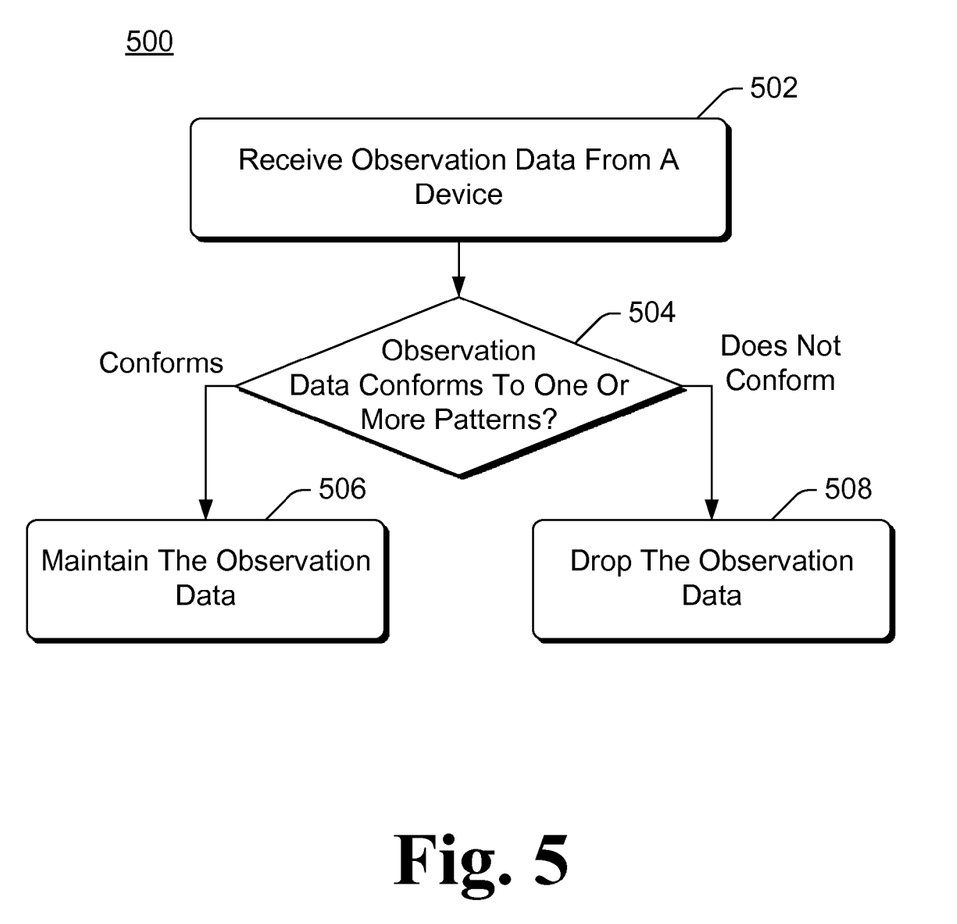
FIG. 5 is a flowchart illustrating an example process for implementing wireless beacon filtering and untrusted data detection in accordance with one or more embodiments.

FIG. 5 is a flowchart illustrating an example process 500 for implementing wireless beacon filtering and untrusted data detection in accordance with one or more embodiments. Process 500 is carried out by a crowd sourcing data service, such as crowd sourcing data service 104 of FIG. 1 or crowd sourcing data service 400 of FIG. 4, and can be implemented in software, firmware, hardware, or combinations thereof. Process 500 is shown as a set of acts and is not limited to the order shown for performing the operations of the various acts. Process 500 is an example process for implementing wireless beacon filtering and untrusted data detection; additional discussions of implementing wireless beacon filtering and untrusted data detection are included herein with reference to different figures.

In process 500, observation data is received from a device (act 502). The observation data includes data identifying signals detected by the device (and optionally various characteristics of the signals) as well as an associated trusted position, as discussed above. The observation data is provided by the device to the crowd sourcing data service based on one or more criteria, as discussed above.

A determination is made as to whether the observation data received in act 502 conforms to one or more patterns (act 504). The one or more patterns are identified based on the one or more criteria used by the device in providing the observation data to the crowd sourcing data service as discussed above.

In response to a determination that the observation data conforms to the one or more patterns, the crowd sourcing data service maintains the observation data (506). The crowd sourcing data service can maintain the observation data by storing the observation data in a data store, or allowing the observation data to remain in a data store, as discussed above.

However, in response to a determination that the observation data does not conform to the one or more patterns, the crowd sourcing data service drops the observation data (508). The crowd sourcing data service can drop the observation data by not storing the observation data in a data store, or deleting the observation data from a data store, as discussed above.

Figure 6:
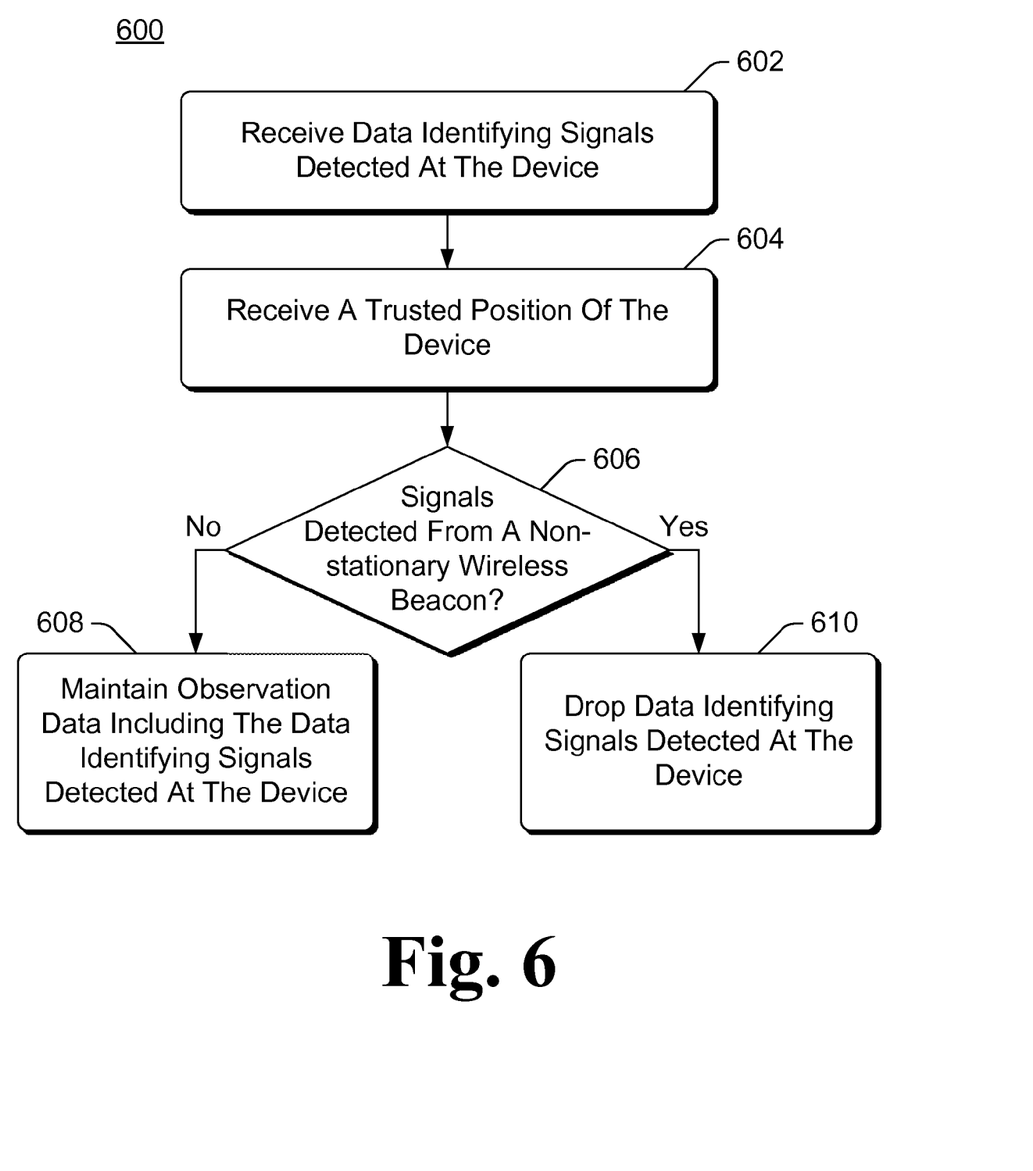
FIG. 6 is a flowchart illustrating another example process for implementing wireless beacon filtering and untrusted data detection in accordance with one or more embodiments.

FIG. 6 is a flowchart illustrating an example process 600 for implementing wireless beacon filtering and untrusted data detection in accordance with one or more embodiments. Process 600 is carried out by a device, such as a device 102 of FIG. 1 or a device 300 of FIG. 3, and can be implemented in software, firmware, hardware, or combinations thereof. Process 600 is shown as a set of acts and is not limited to the order shown for performing the operations of the various acts. Process 600 is an example process for implementing wireless beacon filtering and untrusted data detection; additional discussions of implementing wireless beacon filtering and untrusted data detection are included herein with reference to different figures.

In process 600, data identifying signals detected at the device is received (act 602). The signals can be one or more of various types of wireless signals from various wireless beacons and data identifying various characteristics of the detected signals can also be received, as discussed above.

A trusted position of the device is also received (act 604). The trusted position can be determined in different manners, as discussed above. The trusted position in act 604 is determined at the same particular time as the wireless signals in act 602 are detected, as discussed above.

A determination is made as to whether the data identifying signals detected at the device includes data identifying signals detected from a non-stationary wireless beacon (act 606). Indications of non-stationary wireless beacons are received from a crowd sourcing data service as discussed above.

In response to a determination that the data identifying signals detected at the device does not include data from a non-stationary wireless beacon, observation data is maintained at the device (act 608). The observation data includes the data identifying signals detected at the device received in act 602 (and optionally various characteristics of the signals) as associated with the trusted position received in act 604.

However, in response to a determination that the data identifying signals detected at the device includes data from a non-stationary wireless beacon, the data identifying signals detected at the device received in act 602 is dropped (act 610). The dropping of the data identifying signals detected at the device can be not storing the data identifying signals detected at the device in an observation buffer of the device, or deleting observation data including the data identifying signals detected at the device from an observation buffer of the device, as discussed above.

Various actions such as communicating, receiving, sending, recording, storing, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
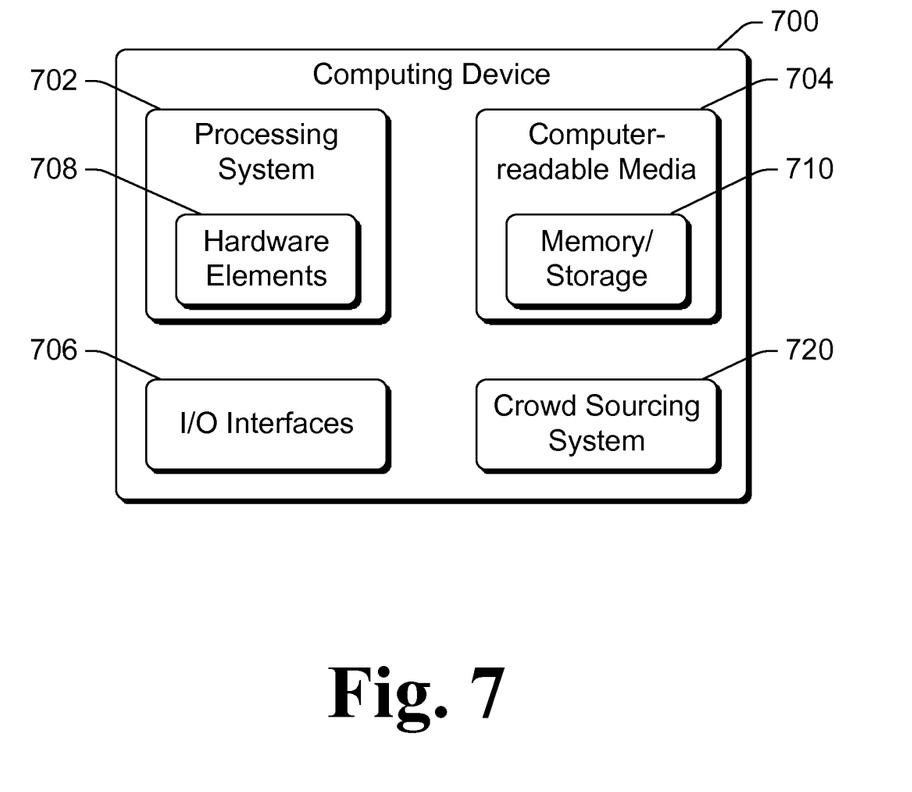
FIG. 7 illustrates an example computing device that can be configured to implement the wireless beacon filtering and untrusted data detection in accordance with one or more embodiments.

FIG. 7 illustrates an example computing device 700 that can be configured to implement the wireless beacon filtering and untrusted data detection in accordance with one or more embodiments. Computing device 700 can, for example, be a device 102 of FIG. 1, implement at least part of crowd sourcing data service 104 of FIG. 1, be a device 300 of FIG. 3, implement at least part of crowd sourcing data service 400 of FIG. 4, and so forth.

Computing device 700 as illustrated includes a processing system 702, one or more computer-readable media 704, and one or more I/O Interfaces 706 that are communicatively coupled to one another. Although not shown, computing device 700 can further include a system bus or other data and command transfer system that couples the various components to one another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 702 is representative of functionality to perform one or more operations using hardware. Accordingly, processing system 702 is illustrated as including hardware elements 708 that can be configured as processors, functional blocks, and so forth. This can include implementation in hardware as an application specific integrated circuit or other logic device formed using one or more semiconductors. Hardware elements 708 are not limited by the materials from which they are formed or the processing mechanisms employed therein. For example, processors can be comprised of semiconductor(s) and/or transistors (e.g., electronic integrated circuits (ICs)). In such a context, processor-executable instructions can be electronically-executable instructions.

Computer-readable media 704 is illustrated as including memory/storage 710. Memory/storage 710 represents memory/storage capacity associated with one or more computer-readable media. Memory/storage 710 can include volatile media (such as random access memory (RAM)) and/or nonvolatile media (such as read only memory (ROM), Flash memory, optical disks, magnetic disks, and so forth). Memory/storage 710 can include fixed media (e.g., RAM, ROM, a fixed hard drive, and so on) as well as removable media (e.g., Flash memory, a removable hard drive, an optical disc, and so forth). Computer-readable media 704 can be configured in a variety of other ways as further described below.

Input/output interface(s) 706 are representative of functionality to allow a user to enter commands and information to computing device 700, and also allow information to be presented to the user and/or other components or devices using various input/output devices. Examples of input devices include a keyboard, a cursor control device (e.g., a mouse), a microphone (e.g., for voice or other audible inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, a tactile-response device, and so forth. Thus, computing device 700 can be configured in a variety of ways to support user interaction.

Computing device 700 also includes a crowd sourcing system 720. Crowd sourcing system 720 provides various crowd sourcing functionality as discussed above. Crowd sourcing system 720 can be, for example, crowd sourcing system 110 with untrusted data detection of FIG. 1, crowd sourcing module 108 with data filtering of FIG. 1, crowd sourcing module 310 with data filtering of FIG. 3, or crowd sourcing system 402 with untrusted data detection of FIG. 4.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques can be implemented on a variety of commercial computing platforms having a variety of processors.

An implementation of the described modules and techniques can be stored on or transmitted across some form of computer-readable media. The computer-readable media can include a variety of media that can be accessed by the computing device 700. By way of example, and not limitation, computer-readable media can include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 700, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 708 and computer-readable media 704 are representative of instructions, modules, programmable device logic and/or fixed device logic implemented in a hardware form that can be employed in some embodiments to implement at least some aspects of the techniques described herein. Hardware elements 708 can include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing can also be employed to implement various techniques and modules described herein. Accordingly, software, hardware, or program modules and other program modules can be implemented as one or more instructions and/or logic embodied on some form of computer-readable storage media and/or by one or more hardware elements 708. Computing device 700 can be configured to implement particular instructions and/or functions corresponding to the software and/or hardware modules. Accordingly, implementation of a module that is executable by the computing device 700 as software can be achieved at least partially in hardware, e.g., through use of computer-readable storage media and/or hardware elements 708 of the processing system. The instructions and/or functions can be executable/operable by one or more articles of manufacture (for example, one or more computing devices 700 and/or processing systems 702) to implement techniques, modules, and examples described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
one or more processors;
one or more computer-readable storage media having stored thereon multiple instructions that, when executed by the one or more processors of the device, cause the one or more processors to:
receive data identifying signals detected by a module of the device at a particular time;
receive a trusted position of the device at the particular time;
determine, at the device based on one or more criteria applied by the device, whether the data identifying signals detected by the module includes data identifying signals detected from a non-stationary wireless beacon;
maintain, in an observation buffer in response to determining that the data identifying signals detected by the module do not include data from a non-stationary wireless beacon, observation data including the data identifying signals detected by the module as associated with the trusted position; and
drop, in response to determining that the data identifying signals detected by the module does include data from a non-stationary wireless beacon, the data identifying signals detected by the module.

2. A device as recited in claim 1, the multiple instructions further causing the one or more processors to delete the observation data from the observation buffer in response to dropping the data identifying signals.

3. A device as recited in claim 1, the multiple instructions further causing the one or more processors to provide, in response to one or more criteria applied by the device being satisfied, the observation data from the observation buffer to a crowd sourcing data service.

4. A device as recited in claim 3, the multiple instructions further causing the one or more processors to receive, from the crowd sourcing data service, an indication of the non-stationary wireless beacon.

5. A device as recited in claim 3, the one or more criteria comprising a current cost of transmission or a battery state.

6. A device as recited in claim 1, the non-stationary wireless beacon comprising a wireless beacon that moves to different positions at greater than a threshold frequency.

7. A device as recited in claim 1, the instructions that cause the one or more processors to receive the trusted position of the device comprising instructions that cause the one or more processors to receive the trusted position of the device from a Global Navigation Satellite System module of the device.

8. A device as recited in claim 1, the multiple instructions further causing the one or more processors to:
receive a request for a position of the device;
determine whether the observation buffer includes observation data having a timestamp within a threshold amount of time of a current time; and
return, in response to the request, a trusted position included in the observation data having the timestamp within the threshold amount of time of the current time.

9. A device as recited in claim 1, the multiple instructions further causing the one or more processors to:
obtain a trusted position of the device included in observation data in the observation buffer; and
provide the trusted position of the device to a Global Navigation Satellite System module as an approximate position of the device.

10. A method implemented on a device, the method comprising:
receiving data identifying signals detected by a module of the device at a particular time;
receiving a trusted position of the device at the particular time;
determining, at the device based on one or more criteria applied by the device, whether the data identifying signals detected by the module includes data identifying signals detected from a non-stationary wireless beacon;
maintaining, in an observation buffer in response to determining that the data identifying signals detected by the module do not include data from a non-stationary wireless beacon, observation data including the data identifying signals detected by the module as associated with the trusted position; and
dropping, in response to determining that the data identifying signals detected by the module does include data from a non-stationary wireless beacon, the data identifying signals detected by the module.

11. A method as recited in claim 10, further comprising providing, in response to the one or more criteria applied by the device being satisfied, the observation data from the observation buffer to a crowd sourcing data service.

12. A method as recited in claim 10, the observation data including data identifying wireless signals received by the device from multiple wireless beacons, as well as, for each of the wireless beacons, an indication of characteristics including strength, timing, frequency, or correlation of the signals received from a transmitter of the wireless beacon.

13. A method as recited in claim 10, the signals detected by the device comprising Wi-Fi signals.

14. A method as recited in claim 10, the signals detected by the device comprising cellular signals.

15. A method as recited in claim 10, the signals detected by the device comprising electromagnetic broadcast signals.

16. A method as recited in claim 10 further comprising obtaining a trusted position of the device included in observation data in the observation buffer; and
providing the trusted position of the device to a Global Navigation Satellite System module as an approximate position of the device.

17. A method as recited in claim 10, the non-stationary wireless beacon comprising a wireless beacon that moves to different positions at greater than a threshold frequency.

18. A method as recited in claim 10 wherein the receiving is done at regular intervals.

19. A method as recited in claim 10, further comprising deleting the observation data from the observation buffer in response to dropping the data identifying signals.

20. A method implemented on a device, the method comprising:

determining a trusted position of the device at a particular time;

detecting at the device, responsive to determining the trusted position, signals at the particular time;

determining, based on one or more criteria applied by the device, whether the signals detected at the device include signals detected from a non-stationary wireless beacon;

maintaining, in an observation buffer in response to determining that the signals detected at the device do not include signals from a non-stationary wireless beacon, observation data including data identifying the signals detected by the module as associated with the trusted position;

dropping, in response to determining that the signals detected at the device do include signals from a non-stationary wireless beacon, data identifying the signals detected at the device; and providing, in response to determining one or more criteria concerning network attributes have been met, the observation data to a data service.

* * * * *